(12) United States Patent
Velusamy et al.

(10) Patent No.: US 11,335,122 B2
(45) Date of Patent: May 17, 2022

(54) METHOD AND ELECTRONIC DEVICE FOR PROCESSING FACIAL IMAGES

(71) Applicant: SAMSUNG ELECTRONICS CO., LTD., Suwon-si (KR)

(72) Inventors: Sudha Velusamy, Bangalore (IN); Rahul Varna, Bangalore (IN); Ravi Prasad Mohan Kini, Mangalore (IN); Aniket Devdatta Rege, Pune (IN); Rishubh Parihar, Indore (IN); Daeyoung Hyun, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 23 days.

(21) Appl. No.: 16/829,350

(22) Filed: Mar. 25, 2020

(65) Prior Publication Data
US 2020/0311386 A1 Oct. 1, 2020

(30) Foreign Application Priority Data

Mar. 25, 2019 (IN) .............................. 201941011541
Dec. 27, 2019 (IN) .............................. 201941011541

(51) Int. Cl.
G06V 40/16 (2022.01)
G06T 5/20 (2006.01)
G06T 5/00 (2006.01)

(52) U.S. Cl.
CPC ............ *G06V 40/171* (2022.01); *G06T 5/002* (2013.01); *G06T 5/20* (2013.01); *G06T 2207/20024* (2013.01); *G06T 2207/30201* (2013.01); *G06V 40/178* (2022.01)

(58) Field of Classification Search
None
See application file for complete search history.

(56) References Cited

U.S. PATENT DOCUMENTS 7,212,657 B2    5/2007  Simon et al.
7,508,961 B2 *  3/2009  Chen .................. G06K 9/00234
                                                     382/118
8,582,834 B2 * 11/2013  Tong ..................... G11B 27/034
                                                     382/118

(Continued)

OTHER PUBLICATIONS

Velusamy, Sudha, et al. "FabSoften: Face beautification via dynamic skin smoothing, guided feathering, and texture restoration." Proceedings of the IEEE/CVF Conference on Computer Vision and Pattern Recognition Workshops. 2020. (Year: 2020).*

(Continued)

*Primary Examiner* — Andrae S Allison
(74) *Attorney, Agent, or Firm* — Sughrue Mion, PLLC

(57) ABSTRACT

A method includes determining information indicative of at least one facial characteristic associated with at least one face in the source image, processing the source image using a filter based on the determined information, performing wavelet decomposition on each of the filtered image and the source image, determining weightage factors associated with the wavelet decomposition of each of the filtered image and the source image, based on the determined information, obtaining a wavelet image to generate a texture restored image from the wavelet decomposition of each of the filtered image and the source image based on the weightage factors.

20 Claims, 11 Drawing Sheets

(56) References Cited

U.S. PATENT DOCUMENTS

| | | | |
|---|---|---|---|
| 8,977,012 B2* | 3/2015 | Ioffe | G06T 5/50 382/118 |
| 9,007,480 B2 | 4/2015 | Ciuc et al. | |
| 9,495,582 B2 | 11/2016 | Guissin et al. | |
| 9,547,790 B2 | 1/2017 | Kim et al. | |
| 2003/0026493 A1* | 2/2003 | Kamath | G06T 5/10 382/260 |
| 2003/0147558 A1* | 8/2003 | Loui | G06K 9/6226 382/225 |
| 2003/0202693 A1* | 10/2003 | Nakajima | G06T 5/40 382/170 |
| 2006/0062455 A1 | 3/2006 | Chiu et al. | |
| 2007/0201754 A1 | 8/2007 | Li | |
| 2009/0304299 A1* | 12/2009 | Motomura | H04N 5/23245 382/254 |
| 2010/0026831 A1 | 2/2010 | Ciuc et al. | |
| 2010/0177981 A1 | 7/2010 | Wang et al. | |
| 2010/0290703 A1 | 11/2010 | Sim et al. | |
| 2013/0077891 A1* | 3/2013 | Nimnual | G06T 7/37 382/276 |
| 2013/0229549 A1* | 9/2013 | Ciuc | H04N 5/2621 348/242 |
| 2014/0056509 A1* | 2/2014 | Nakashima | H04N 19/176 382/154 |
| 2015/0154743 A1* | 6/2015 | Ioffe | G06T 5/20 382/225 |
| 2015/0269417 A1 | 9/2015 | Kim et al. | |
| 2017/0132767 A1* | 5/2017 | Schachter | H04N 5/33 |

OTHER PUBLICATIONS

Bavirisetti, Durga Prasad, and Ravindra Dhuli. "Multi-focus image fusion using multi-scale image decomposition and saliency detection." Ain Shams Engineering Journal 9.4 (2018): 1103-1117. (Year: 2018).*

Ivaylo Boyadzhiev et al. "Band-Sifting Decomposition for Image Based Material Editing" ACM Transactions on Graphics, vol. 32, No. 5, Sep. 2015, (pp. 1-16).

Uri Lipowezky et al. "Automatic Freckles Detection and Retouching" IEEEI, 2008, (6 pages total).

KateLawrence et al. Age, gender, and puberty influence the development of facial emotion recognition Frontiers in Psychology, vol. 6, Article 761, Jun. 2015, (pp. 1-14).

S.Kother Mohideen et al. "Image De-noising using Discrete Wavelet transform" International Journal of Computer Science and Network Security, vol. 8, No. 1, Jan. 2008, (5 pages total).

Ms. Sulochana et al. "Design and Testing of DWT based Image Fusion System using MATLAB—Simulink" International Journal of Advanced Research in Electrical Electronics and Instrumentation Engineering, vol. 3, Issue 3, Mar. 2014, (8 pages total).

International Search Report and Written Opinion (PCT/ISA/210 and PCT/ISA/237), dated Jul. 2, 2020 by International Searching Authority in International Application No. PCT/KR2020/004073.

Communication dated Dec. 22, 2021 issued by the European Patent Office in application No. 20777535.4.

Fredembach, C., et al., "Combining visible and near-infrared images for realistic skin smoothing", Society for Imaging Science and Technology, $17^{th}$ Color Imaging Conference Final Program and Proceedings, Nov. 9, 2009, pp. 242-247, XP055601879.

Lee, C., et al., "An Algorithm for Automatic Skin Smoothing in Digital Portraits", Image Processing, $16^{th}$ IEEE Int'l Conference on Image Processing, Nov. 7, 2009, pp. 3149-3152, XP031629094.

Liang, L., et al., "Facial Skin Beautification using Region-Aware Mask", 2013 IEEE International Conference on Systems, Man, and Cybernetics, Oct. 13, 2013, pp. 2922-2926, XP032557461.

Sumi, S., et al., "Interactive Evolutionary Image Processing for Face Beautification Using Smaller Population Size", 2012 IEEE International Symposium on Intelligent Signal Processing and Communication Systems (ISPACS 2012), Nov. 4-7, 2012, pp. 48-53, XP032338384.

* cited by examiner

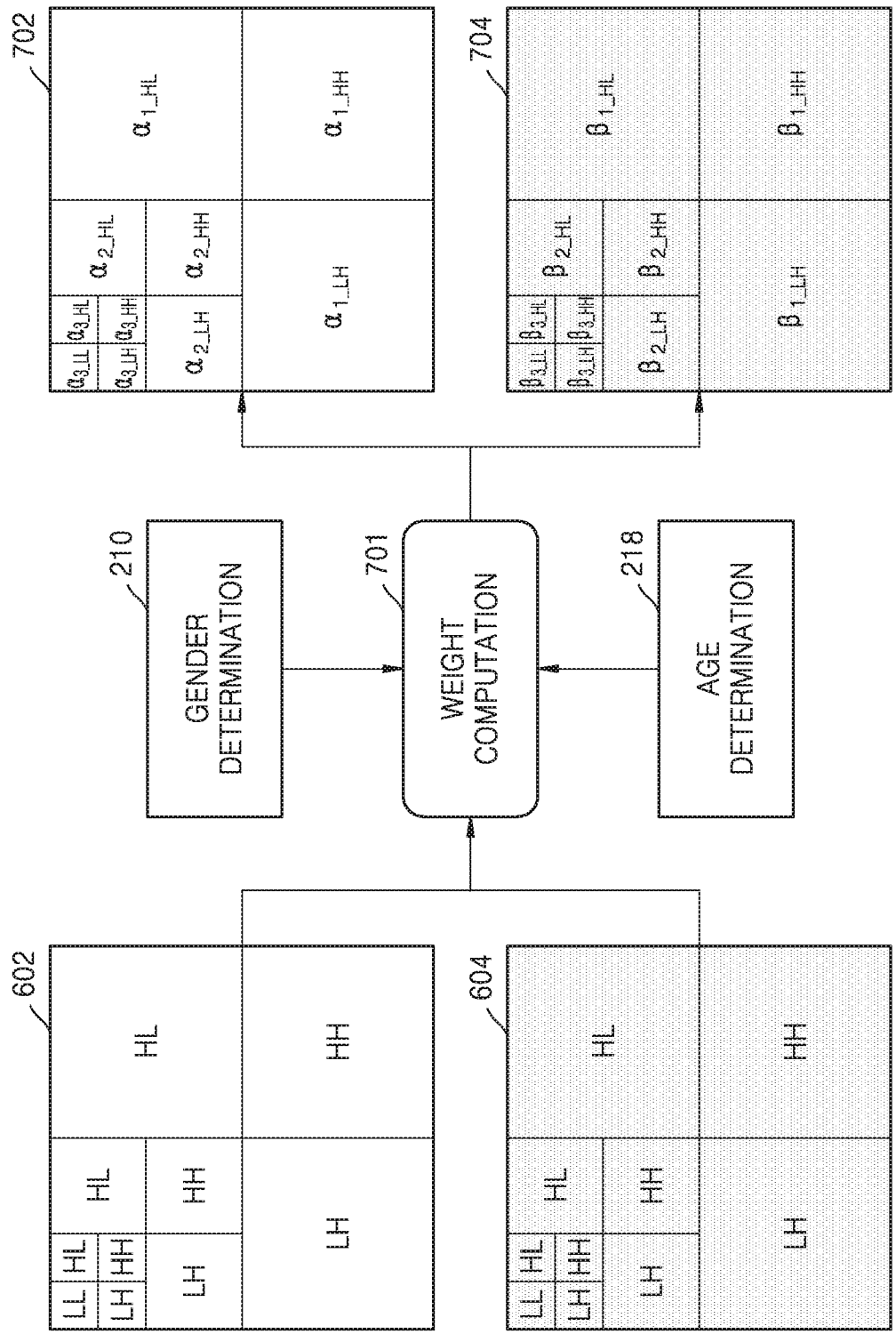

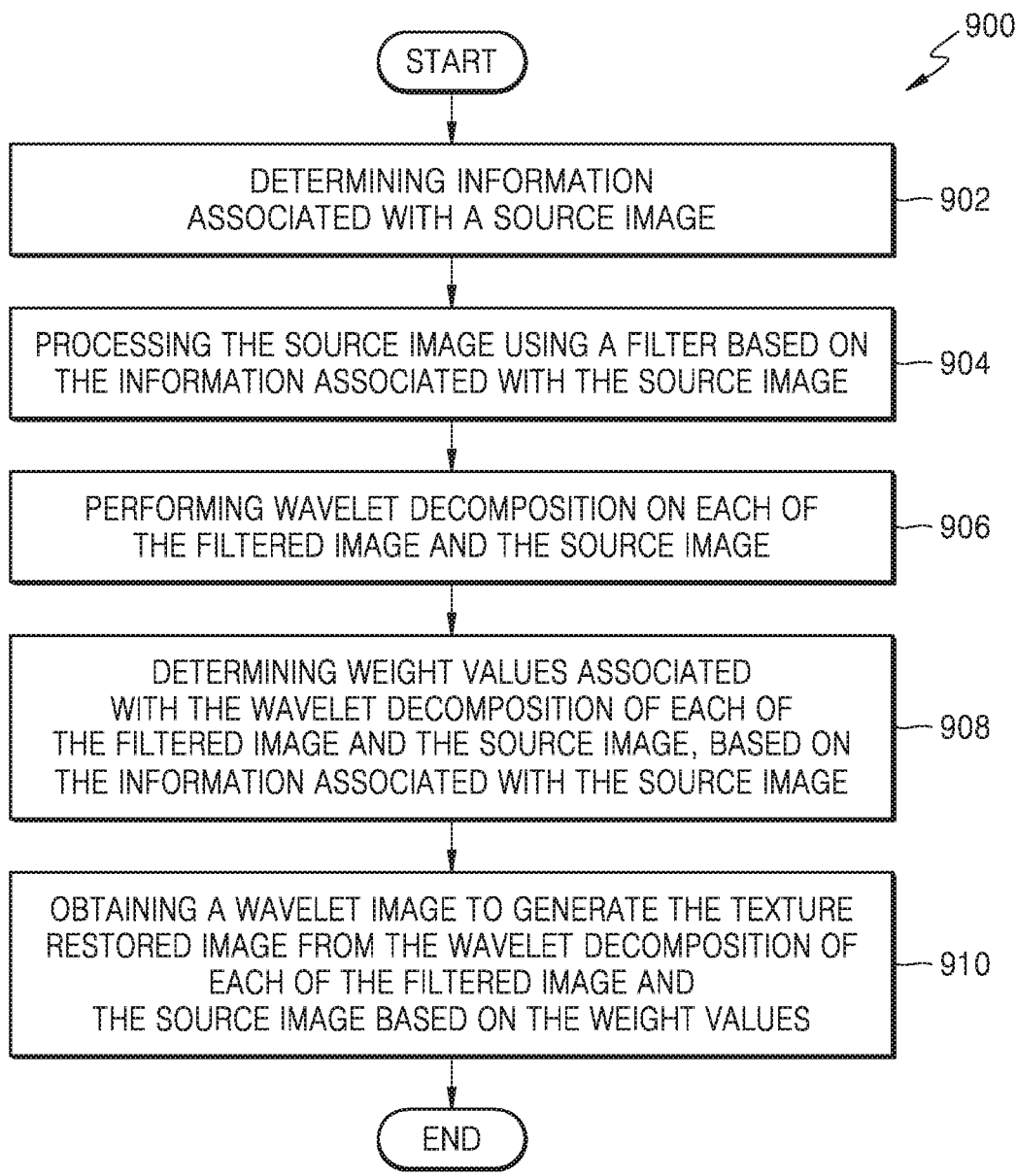

METHOD AND ELECTRONIC DEVICE FOR PROCESSING FACIAL IMAGES

CROSS-REFERENCE TO RELATED APPLICATION(S)

This application is based on and claims priority under 35 U.S.C. § 119 to Indian Patent Application No. 201941011541 (PS) filed on Mar. 25, 2019 and Indian Patent Application No. 201941011541 (CS), filed on Dec. 27, 2019, in the Indian Intellectual Property Office, the disclosure of each of which is incorporated by reference herein in its entirety.

BACKGROUND

1. Field

The disclosure relates to image processing. More particularly, the disclosure relates to a method and an electronic device for processing facial images.

2. Description of Related Art

With the advance of technology, the electronic devices such as digital cameras, smart phones, notebooks, laptops, etc., are able to capture and process images to enhance appearance of objects. Faces of people are frequently captured by the image capturing devices, and face enhancement or beautification applications have huge popularity among users, who capture and post self-portrait images on social media.

SUMMARY

In accordance with an aspect of the disclosure, there is provided a method of generating a texture restored image by enhancing a source image. The method includes determining information associated with a source image. The information is indicative of at least one facial characteristic associated with at least one face in the source image. The method includes processing the source image using a filter based on the information associated with the source image. Further, the method includes performing wavelet decomposition on each of the filtered image and the source image. The method also includes determining weightage factors associated with the wavelet decomposition of each of the filtered image and the source image, based on the information associated with the source image. Further, the method includes obtaining a wavelet image to generate the texture restored image from the wavelet decomposition of each of the filtered image and the source image based on the weightage factors for processing the source image.

In accordance with an aspect of the disclosure, there is provided an electronic device for generating a texture restored image by enhancing a source image. The electronic device includes a processor configured to determine information associated with a source image. The information is indicative of at least one facial characteristic associated with the at least one face in the source image. The processor is configured to process the source image using a filter based on the information associated with the source image. Further, the processor is configured to perform wavelet decomposition on each of the filtered image and the source image. The processor is also configured to determine weightage factors associated with the wavelet decomposition of each of the filtered image and the source image, based on the information associated with the source image. Further, the processor is configured to obtain a wavelet image to generate the texture restored image from the wavelet decomposition of each of the filtered image and the source image based on the weightage factors for processing the source image.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 illustrates a block diagram for weightage factor determination associated with wavelet decomposed images, according to an embodiment;

FIG. 9 illustrates a flowchart for generating a texture restored image by enhancing a source image, according to an embodiment.

DETAILED DESCRIPTION

Figure 1:
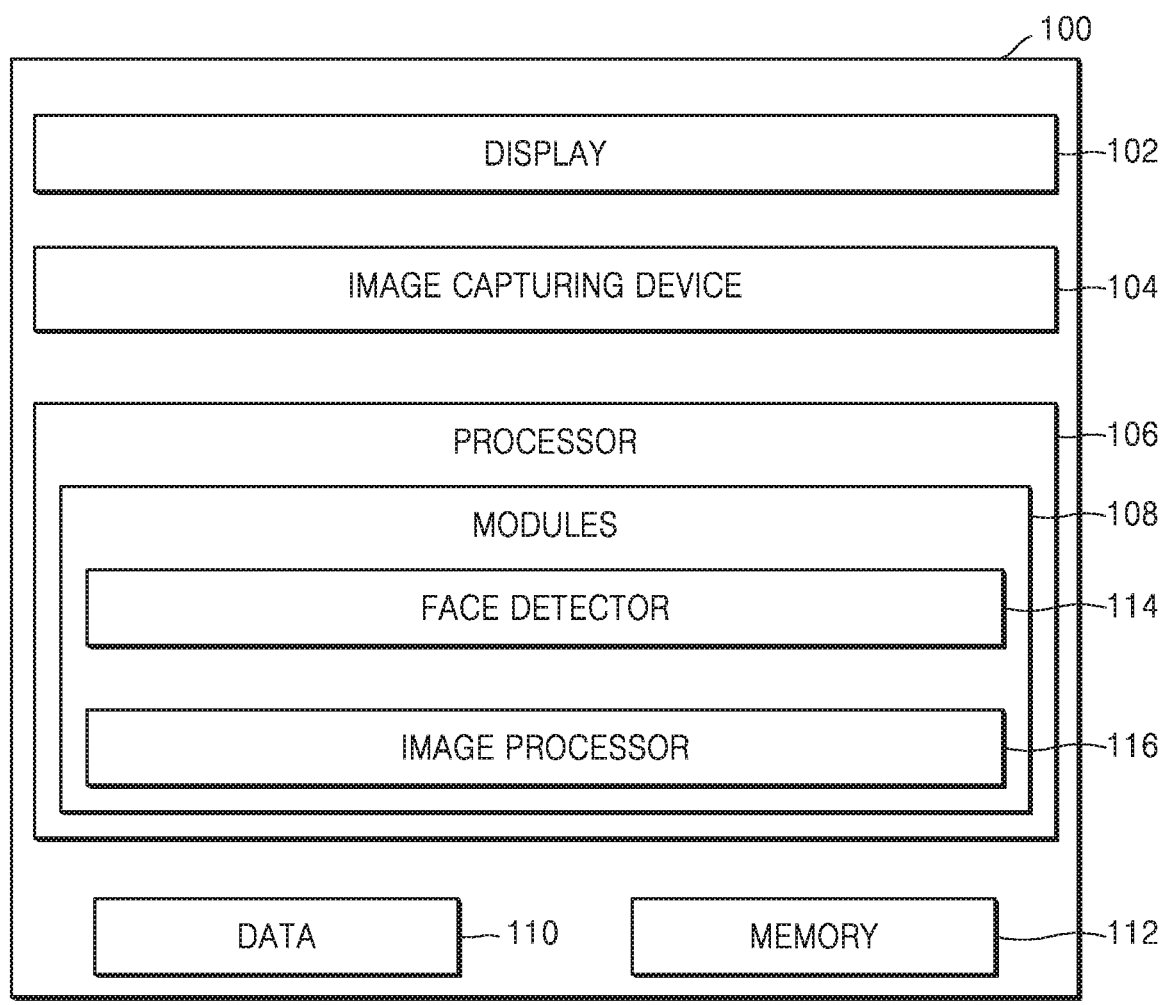
FIG. 1 illustrates a block diagram of an electronic device for generating a texture restored image by enhancing a source image, according to an embodiment.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness of the description.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components. For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. Unless otherwise defined, all technical and scientific terms used herein have the same meaning as commonly understood by one of ordinary skilled in the art to which this disclosure belongs. The system, methods, and examples provided herein are illustrative only and not intended to be limiting.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Embodiments of the present disclosure will be described below in detail with reference to the accompanying drawings.

Electronic devices such as digital cameras, smart phones, tablets, laptops, etc., are able to capture and process images to enhance appearance of objects. As discussed, human faces are the most frequently captured object by the image capturing devices, and face enhancement or beautification applications are very popular among users, who capture and post self-portrait type images on social media. Such applications employ filters that perform various functions or steps such as face softening to generate enhanced facial images. Face softening performs a perfect blemish removal while retaining the underlying skin textures to provide natural looking beautiful faces.

Filters remove underlying fine-grained skin textures in the captured facial image while smoothing any blemishes in the facial image. This results in an artificial or a fake-like skin in the enhanced image of the related art apparatus.

FIG. 1 illustrates a block diagram of an electronic device 100 for generating a texture restored image by enhancing a source image, according to an embodiment.

In an embodiment, the electronic device 100 may be capable of capturing, processing, and rendering the captured images. The electronic device 100 may be embodied in one of a smartphone, a tablet, a digital camera, a camcorder, a computer device, and a video camera. In an embodiment, the electronic device 100 may be embodied as any device which is capable of capturing images, but this is not limiting. Embodiments of the disclosure may also be applied to a case in which a television or a computer is communicatively connected to an image capturing apparatus via a wired or wireless network.

The electronic device 100 may interchangeably be referred to as the device. The electronic device 100 may be capable of capturing a still image or a moving image associated with a scene. The electronic device 100 may include a display 102 and an image capturing device 104 in communication with the display 102. The image capturing device 104 may be configured to render a scene on the display 102. In an embodiment, the display 102 of the electronic device 100 may include, but is not limited to, a touch screen display. In an embodiment, the electronic device 100 may be operated, via the display 102, to control the image capturing device 104 for rendering the scene on the display 102.

Further, the electronic device 100 includes a processor 106, module(s) 108, data 110, and a memory 112. The display 102, the image capturing device 104, the processor 106, the modules(s) 108, and the memory 112 are communicatively coupled with each other via a bus. The data 110 serves, amongst other things, as a repository for storing data processed, received, and generated by the processor 106.

The processor 106 can be a single processing unit or a number of units, all of which could include multiple computing units. The processor 106 may be implemented as one or more microprocessors, microcomputers, microcontrollers, digital signal processors, central processing units, state machines, logic circuitries, and/or any devices that manipulate signals based on operational instructions. Among other capabilities, the processor 106 is configured to fetch and execute computer-readable instructions and data stored in the memory 112.

The memory 112 may include any non-transitory computer-readable storage medium known to those skilled in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The module(s) 108, amongst other things, include routines, programs, objects, components, data structures, etc., which perform particular tasks or implement data types. The module(s) 108 may also be implemented as, signal processor(s), state machine(s), logic circuitries, and/or any other device or component that manipulate signals based on operational instructions.

Further, the module(s) 108 can be implemented in hardware, instructions executed by a processing unit, or by a combination thereof. The processing unit may include a computer, a processor, a state machine, a logic array, or any other suitable device or devices capable of processing instructions. The processing unit can be a general-purpose processor which executes instructions to cause the general-purpose processor to perform the required tasks or, the processing unit can be dedicated to perform the required functions. For example, the module(s) 108 may be software (e.g., a program) containing one or more instructions that are stored in a machine, e.g., computer-readable storage medium, such as, for example, in an internal memory or an external memory, which, when executed by a processor or a processing unit, may perform any of the described functionalities.

In an embodiment, the module(s) 108 may include a face detector 114 and an image processor 116. The face detector 114 and the image processor 116 are in communication with each other. The data 110 serves, amongst other things, as a repository for storing data processed, received, and generated by one or more of the modules 108. In an embodiment, the module(s) 108 may be implemented as a part of the processor 106, may be external to the processor 106, may be a part of the memory 112, and/or may be a part of hardware separate from the processor 106.

Figure 2A:
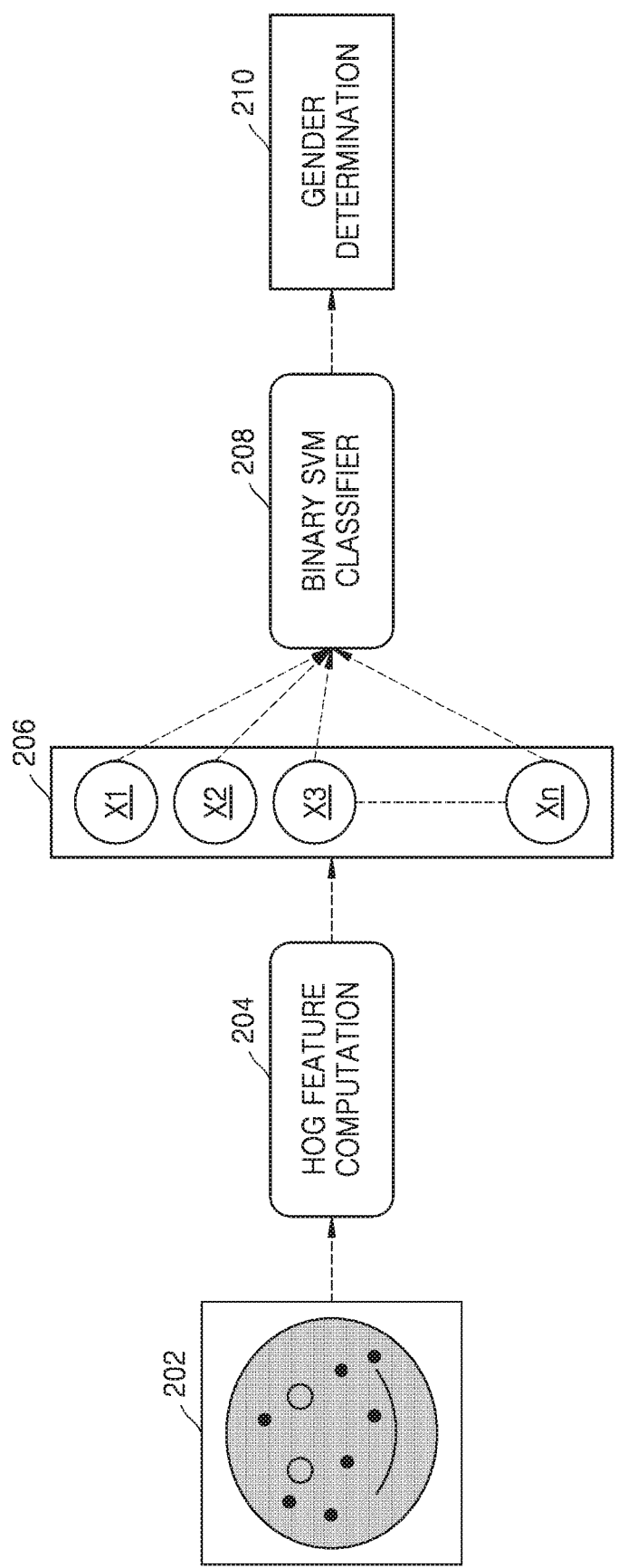
FIG. 2A illustrates a flow diagram for a gender determination, according to an embodiment.

FIG. 2A illustrates a flow diagram for a gender determination with a source image, according to an embodiment.

Referring to FIG. 2A, the face detector 114 may be configured to receive the source image. Further, the face detector 114 may be configured to detect at least one face in the source image. In an embodiment, the at least one face may interchangeably be referred to as the face. The face may be detected as a human face. The face detector 114 may be configured to obtain a region of interest (ROI) 202 from the source image to be processed. The ROI 202 may be indicative of the face of a person presented in the source image. Therefore, the ROI 202 may interchangeably be referred to as the face ROI 202, but this is not limiting.

In an embodiment, the image processor 116 may be configured to determine information associated with the source image. The information may include or be indicative of at least one facial characteristics associated with the face image in the source image. In an embodiment, the at least one facial characteristic may include, but is not limited to, a level of skin texture, an amount of blemishes, an average size of blemishes, age associated with the face image, and gender associated with the face image. For instance, the image processor 116 may receive the face ROI 202 obtained by the face detector 114. Based on the face ROI 202, the image processor 116 may be configured to determine the facial characteristics associated with the face image of the person presented in the source image.

Further, the image processor 116 may implement image processing techniques, such as Histogram of Oriented Gradients (HOG), to determine the age and/or the gender associated with the face image. For instance, referring to FIG. 2A, in operation 204, the image processor 116 may perform HOG feature computation on the face ROI 202 to identify a set of HOG features 206 associated with the face image. With respect to the gender determination (operation 210), the following process may be performed.

With a given input face image and the face ROI 202, a bounding box for at least one face image inside the face ROI 202 is detected. Next, HOG features inside the face ROI 202 may be computed. The HOG may decompose the face image into small squared cells to compute HOG of each cell. The computed HOG of each cell may be normalized and result in a descriptor of each cell. The descriptors of all these small squared cells partitioned from the face ROI 202 may be concatenated to obtain the descriptor of the face ROI 202.

The electronic device 100 may have two trained Support Vector Machine (SVM) classifiers for the gender and the age determination.

The binary SVM classifier 208 among the two SVM classifiers may take the descriptor of the face ROI 202 as an input to the binary SVM classifier and output the class which can be either male or female of the face image.

In detail, the image processor 116 may be employed with a binary SVM classifier 208, to classify the set of HOG features in one of gender classes, such as male and female. Based on the classification, in operation 210, the image processor 116 may determine the gender of the face.

Figure 2B:
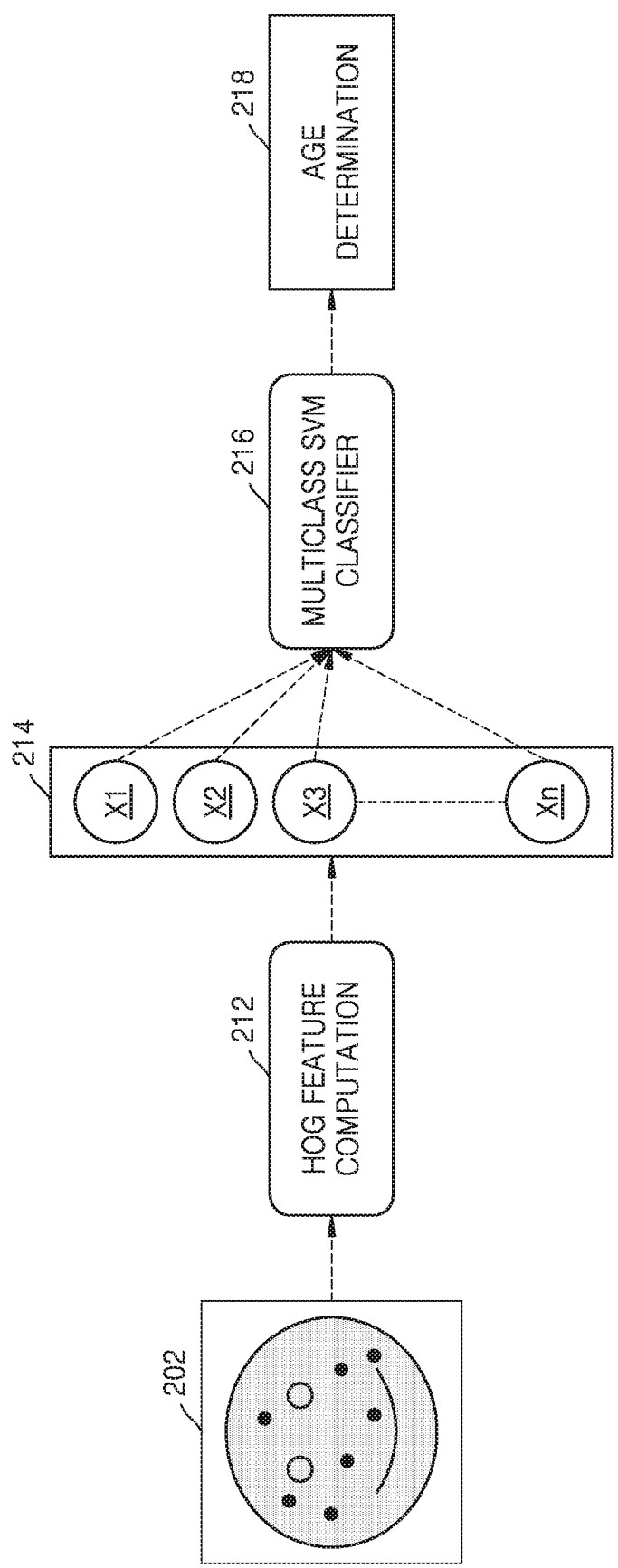
FIG. 2B illustrates a flow diagram for an age determination, according to an embodiment.

FIG. 2B illustrates a flow diagram for an age determination with a source image, according to an embodiment.

Referring to FIG. 2B, the image processor 116 may perform HOG feature computation (operation 212) on the face ROI 202 to identify a set of HOG features 214 associated with the face image. Further, the image processor 116 may be employed with a multiclass SVM classifier 216, to classify the set of HOG features 214 in one of age classes, such as infant, teenager, adult, and old. In operation 218, based on the classification, the image processor 116 may determine the age of the face image.

In detail, with a given input face image and the face ROI 202, a bounding box for at least one face image inside the face ROI 202 is detected. Next, HOG features inside the face ROI 202 may be computed. The HOG may decompose the face image into small squared cells to compute HOG of each cell. The computed HOG of each cell may be normalized and result in a descriptor of each cell. The descriptors of all these small squared cells partitioned from the face ROI 202 may be concatenated to obtain the descriptor of the face ROI 202.

The multiclass SVM classifier may take the descriptor of the face ROI 202 as an input and output one of the multiple classes—for example, the 5 classes which can be classes of child, young, youth, adult and old. In an embodiment, the number of multiple classes may be decreased or increased.

Figure 3:
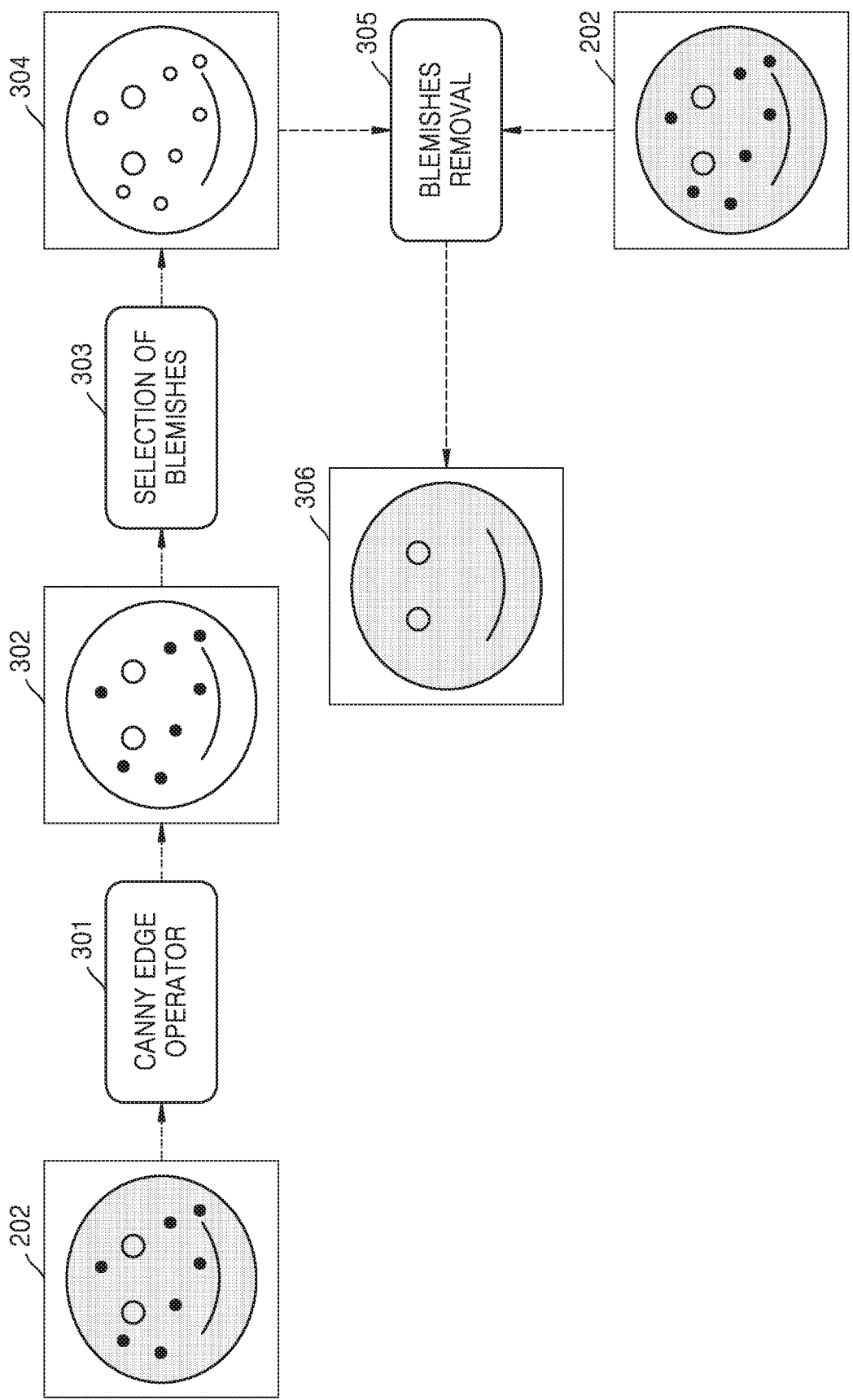
FIG. 3 is a flow diagram illustrating a generation of a blemish-removed image, according to an embodiment.

FIG. 3 is a flow diagram illustrating a generation of a blemish-removed image using the source image, according to an embodiment.

Referring to FIG. 3, the image processor 116 may be configured to determine at least one region associated with the face ROI 202 obtained from the source image. The at least one region may be indicative of at least one blemish on the face image. The at least one region may interchangeably be referred to as the blemish region, but this is not limiting. In an embodiment, the image processor 116 may implement image processing techniques, such as a canny edge operator 301, for detecting edges in the face ROI 202. Based on the detected edges, the image processor 116 may generate an edge image 302 corresponding to the face ROI 202. The detected edges in the edge image 302 may include a plurality of pixels. The image processor 116 may perform traversal for each pixel among the plurality of pixels. Such traversal may be performed by the image processor 116 until a loop of pixels may be identified in the edge image 302.

Subsequently, the image processor 116 may determine a number of pixels in the identified loop of pixels. In operation 303, the image processor 116 may identify the identified loop of pixel as the blemish region indicative of the blemish, if the number of pixels in the identified loop is above a threshold number of pixels. Based on the identified region, the image processor 116 may generate a spot mask 304 which indicates the blemishes on the face. Further, based on the spot mask 304, the image processor 116 may determine an average size of blemishes and an amount of blemishes associated with the face. Alternatively, the image processor 116 may identify at least one blemish by detecting a plurality of pixels of which color values (RGB values) change or vary above a threshold value compared to neighboring pixels. That is to say, if the color value of pixels drastically change or vary compared to the color value of neighboring pixels, the image processor 116 may determine such pixels as blemishes.

As shown in FIG. 3, the image processor 116 may perform various image processing techniques to remove the blemishes (operation 305) by using the spot mask 304 and the face ROI 202. For instance, the image processor 116 may perform a smoothing operation on the blemish region associated with the blemish by using the face ROI 202. In the smoothing operation, the image processor 116 may generate a smooth region corresponding to the blemish region. The image processor 116 may replace pixels associated with the blemish region with pixels surrounding such blemish from the face ROI 202 to perform the smoothing operation. Subsequently, the image processor 116 may generate the smooth region corresponding to each of the blemish regions on the spot mask 304. Based on the smooth region, the image processor 116 may generate a blemish-removed image 306.

Figure 4:
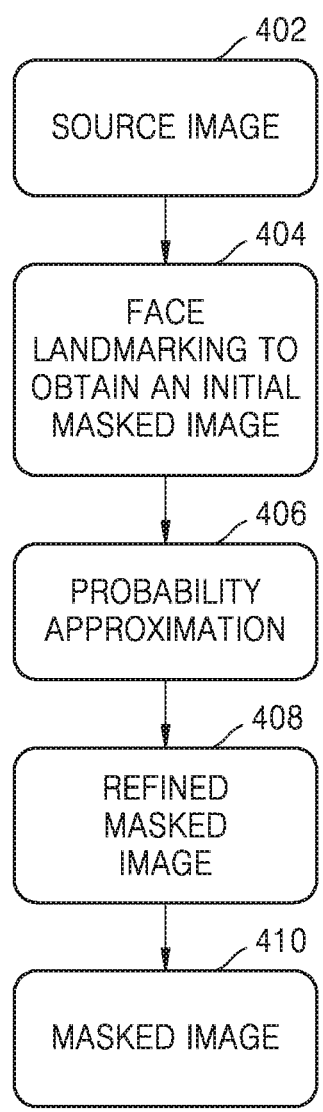
FIG. 4 illustrates a flowchart of generating a masked image, according to an embodiment.

FIG. 4 illustrates a flowchart of generating a masked image from the source image, according to an embodiment.

Referring to FIG. 4, the image processor 116 may determine at least one skin region and at least one other region associated with the face ROI 202 obtained from the source image. Subsequently, the image processor 116 may generate a masked image based on the at least one skin region and the at least one another region associated with the face ROI 202. In an example, the at least one skin region may be associated with facial features including, but not limited to, forehead, cheeks, and chin. In one example, the at least one another region may be associated with hair-like features including, but not limited to, beard, mustache, eyebrows, and eyelashes of the face. In another example, the at least one another region may be associated with facial features including, but not limited to, eyes, mouth, and lips. In an embodiment, the image processor 116 may implement image processing technique, such as feathering technique, probability approximation, and face landmarking, to generate the masked image.

In operation 402, the image processor 116 may obtain a source image containing a face image of a person. In operation 404, the image processor 116 may perform image processing and detect a plurality of face landmarking—for example, 68 face landmarking—points on the face image of a person. The facial landmarking points are located at the contour of the eyes, eye-brows, nose, lips and face shape contours of the face image. Once the facial landmarking points are obtained, an initial masked image may be obtained using the facial landmarking points. In operation 406, the image processor 116 may perform probability approximation by connecting or joining the landmarking points using spline curves and fill the different segments with different gray values which result in the initial masked image. For instance, the image processor 116 may perform probability approximation to identify at least one skin region and at least one non-skin region in the initial masked image. The image processor 116 may refine the initial masked image by computing skin probability of each pixel in the face ROI 202 to obtain a refined masked image (operation 408). For example, if the skin probability is greater than 0.5 for a pixel, the pixel is considered as a skin region.

Based on the skin probability computation for each pixel in the face ROI 202 and determinations of whether or not each pixel is a skin region, the final masked image may be generated in operation 410.

Figure 5:
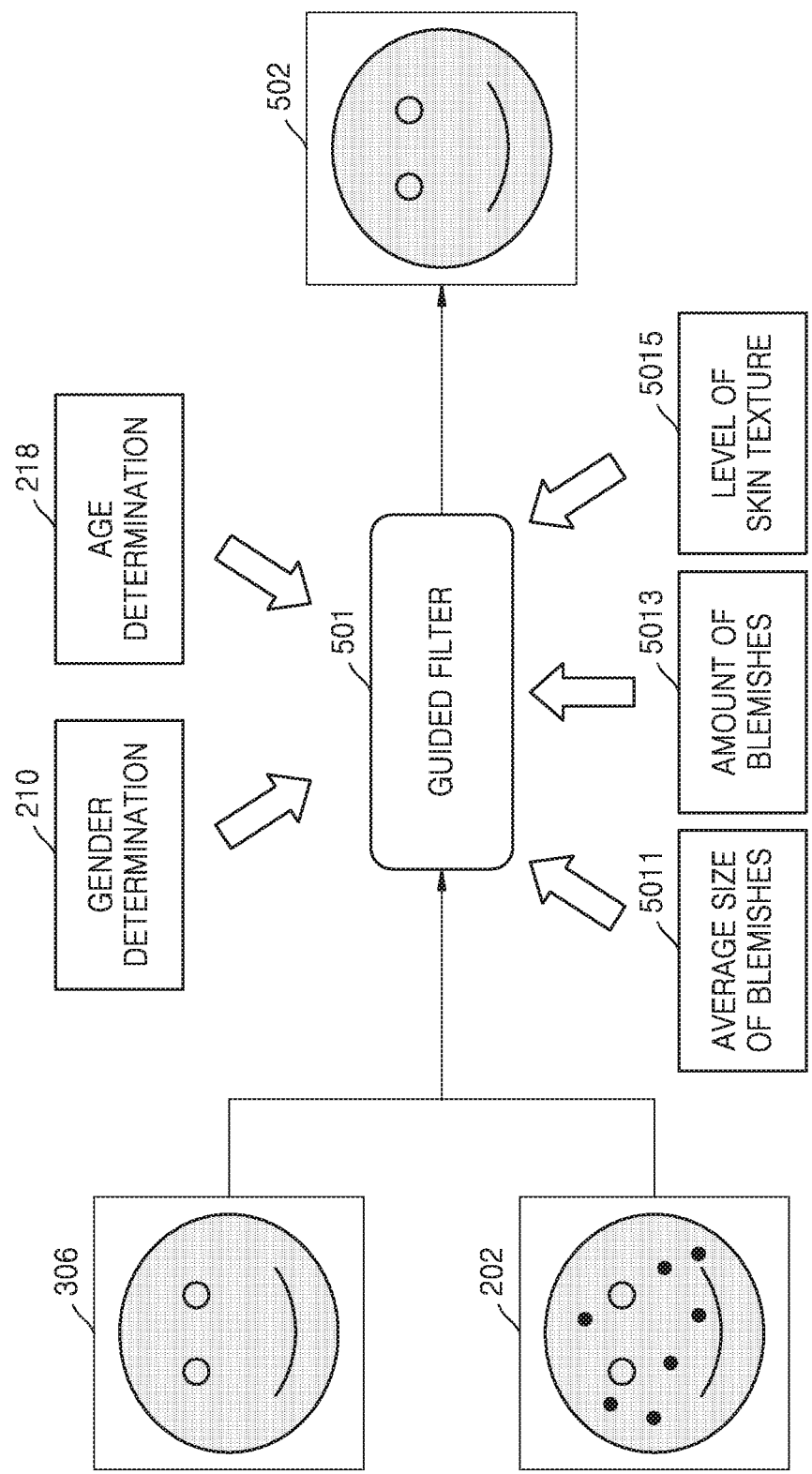
FIG. 5 illustrates a flow diagram of generating a filtered image, according to an embodiment.

FIG. 5 illustrates a flow diagram of generating a filtered image, according to an embodiment. Referring to FIG. 5, the image processor 116 may be configured to process the source image using a filter based on the information associated with the source image. The image processor 116 may process the source image using the filter based on the masked image, the blemish-removed image 306, and the facial characteristics associated with the source image. In an embodiment, the image processor 116 may implement a guided filter 501 to filter the source image. In an embodiment, the image processor 116 may generate a filtered image 502 with the guided filter based on the blemish-removed image 306, the face ROI 202, and the facial characteristics associated with the source image.

Figure 6:
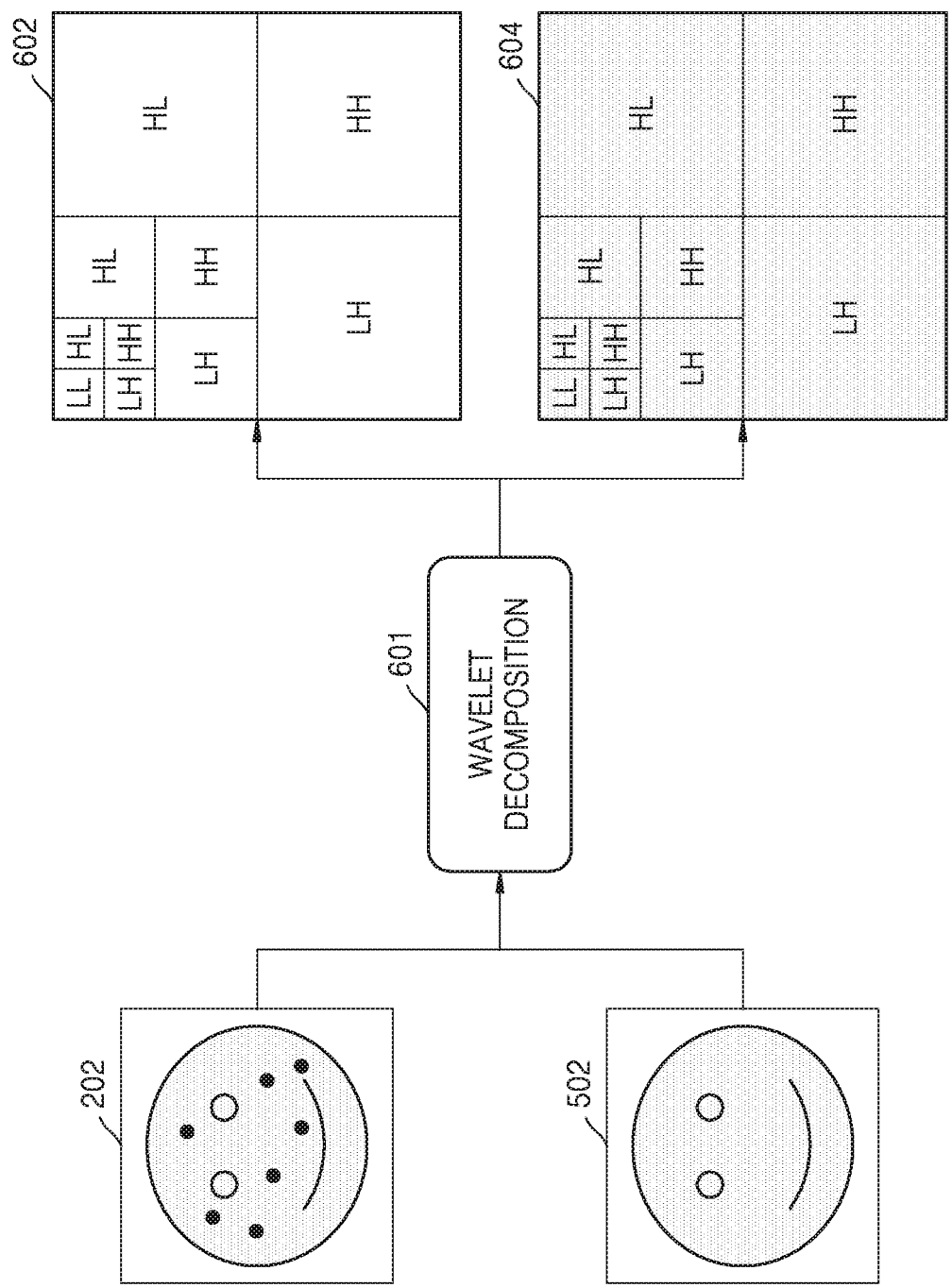
FIG. 6 illustrates a block diagram of generating wavelet decomposed images, according to an embodiment.

The image processor 116 may provide the face ROI 202 and/or the masked image generated in operation 410 as an input image and a blemish-removed image, respectively, to the guided filter 501. Further, the image processor 116 may dynamically set various kernel parameters associated with the guided filter based on the blemish-removed image 306 and the facial characteristics which include a level of skin texture 5015, an amount of blemishes 5013, an average size of blemishes 5011, the age associated with the face image (determined in operation 218), and the gender associated with the face image (determined in operation 210). Subsequently, the guided filter may generate the filtered image 502 based on the input image, the masked image, and dynamically set kernel parameters. FIG. 6 illustrates a block diagram of generating wavelet decomposed images corresponding to the source image and the filtered image, according to an embodiment. The image processor 116 may perform wavelet decomposition on each of the filtered image and the source image.

Referring to FIG. 6, the image processor 116 may perform wavelet decomposition on each of the filtered image 502 and the face ROI 202 associated with the source image, in operation 601. In an embodiment, the image processor 116 may determine a number of levels of decomposition to be performed on the face ROI 202 of the source image based on the facial characteristics. For instance, the image processor 116 may allocate a higher number of levels of decomposition to the face image associated with a male in comparison to the face image associated with a female.

Further, image processor 116 may perform the wavelet decomposition for the determined number of levels on the face ROI 202 of the source image to generate a first wavelet decomposed image 602. Similarly, the image processor 116 may determine a number of levels of decomposition to be performed on the filtered image 502 based on the facial characteristics associated with the source image. Further, the image processor 116 may perform the wavelet decomposition for the determined number of levels on the filtered image 502 to generate a second wavelet decomposed image 604.

In an embodiment, the image processor 116 may perform wavelet decomposition for three levels on the face ROI 202 and the filtered image 502 to generate the first wavelet decomposed image 602 and the second wavelet decomposed image 604, respectively. Each level of the first wavelet decomposed image 602 and the second wavelet decomposed image 604 includes a plurality of wavelet bands. In an embodiment, the number of wavelet bands may be determined based on the facial characteristics associated with the source image. For instance, a first level of each of the first wavelet decomposed image 602 and the second wavelet decomposed image 604 includes three wavelet bands indicated as High-Low (HL), High-High (HH), and Low-High (LH). Further, a second level of each of the first wavelet decomposed image 602 and the second wavelet decomposed image 604 includes three wavelet bands indicated as HL, HH, and LH. Furthermore, a third level of each of the first wavelet decomposed image 602 and the second wavelet decomposed image 604 includes four wavelet bands indicated as HL, HH, LH, and Low-Low (LL).

FIG. 7 illustrates a block diagram for weightage factor determination associated with wavelet decomposed images based on the information of the source image, according to an embodiment.

The term 'weight value(s)' may be used interchangeably with the term 'weightage factor(s)'.

Referring to FIG. 7, the image processor 116 may determine weight values or weightage factors based on the information associated with source image, in operation 701. The image processor 116 may be configured to determine weightage factors associated with the wavelet decomposition of each of the filtered image 502 and the face ROI 202 of the source image. In an embodiment, the image processor 116 may be employed with an Artificial Intelligence (AI) model, such as a Neural Network (NN) model for predicting index values corresponding to the facial characteristics associated with the face image in the source image. For instance, the NN model may predict index values as $I_a$, $I_g$, $I_{ns}$, $I_{ss}$ corresponding to the age associated with the face (determined in operation 218), the gender associated with the face (determined in operation 210), the amount and/or number of blemishes, and the average size of blemishes, respectively.

Further, the image processor 116 may determine the weightage factors corresponding to each wavelet band at multiple levels of each of the first wavelet decomposed image 602 and the second wavelet decomposed image 604 based on the facial characteristics. In an embodiment, the image processor 116 may determine the weightage factors $\alpha_{l\_pq}$ (reference numeral 702) corresponding to each wavelet band of the first wavelet decomposed image 602 by using the Equation (1).

$$\alpha_{l\_pq} = \Theta 1 * I_{a\_pq} + \Theta 2 * I_{g\_pq} + \Theta 3 * I_{ns\_pq} + \Theta 4 * I_{ss\_pq} \quad \text{Equation (1)}$$

In the above Equation (1), values of "l" denote a number of levels of decomposition associated with the first wavelet decomposed image 602. The values of "l" may be 1, 2, 3, . . . L, denoting the first level, the second level, and the third level to $L^{th}$ level, but this is not limiting. Further, in the Equation (1), "pq" denotes wavelet bands, such as LL, LH, HL, and HH of the first wavelet decomposed image 602. Furthermore, values of $\Theta_a$ may be selected empirically based on experimentations.

Referring to FIG. 7, the weightage factors associated with the wavelet bands, HL, HH, and LH at the first level may be denoted with $\alpha_{1\_HL}$, $\alpha_{1\_HH}$, and $\alpha_{1\_LH}$, respectively. Further, the weightage factors associated with the wavelet bands, HL, HH, and LH at the second level may be denoted with $\alpha_{2\_HL}$, $\alpha_{2\_HH}$, and $\alpha_{2\_LH}$, respectively. Furthermore, the weightage factors associated with the wavelet bands, LL, HL, HH, and LH at the third level may be denoted with $\alpha_{3\_LL}$, $a_{3\_HL}$, $\alpha_{3\_HH}$, and $\alpha_{3\_LH}$, respectively.

Similarly, the image processor 116 may determine the weightage factors $\beta_{l\_pq}$ (reference numeral 704) corresponding to each wavelet band of the second wavelet decomposed image 604 by using the Equation (2).

$$\beta_{l\_pq} = \Phi 1 * I_{a\_pq} + \Phi 2 * I_{g\_pq} + \Phi 3 * I_{ns\_pq} + \Phi 4 * I_{ss\_pq} \quad \text{Equation (2)}$$

In the above Equation (2), values of "l" denote a number of levels of decomposition associated with the second wavelet decomposed image 604. The values of "l" may be 1, 2, 3, . . . L, denoting the first level, the second level, and the third level to $L^{th}$ level, but this is not limiting. Further, in the Equation (2), "pq" denotes wavelet bands, such as LL, LH, HL, and HH of the second wavelet decomposed image 604. Furthermore, values of Φb may be selected empirically based on experimentations.

Referring to FIG. 7, the weightage factors associated with the wavelet bands, HL, HH, and LH at the first level may be denoted with $\beta_{1\_HL}$, $\beta_{1\_HH}$, and $\beta_{1\_LH}$, respectively. Further, the weightage factors associated with the wavelet bands, HL, HH, and LH at the second level may be denoted with $\beta_{2\_HL}$, $\beta_{2\_HH}$, and $\beta_{2\_LH}$, respectively. Furthermore, the weightage factors associated with the wavelet bands, LL, HL, HH, and LH at the third level may be denoted with $\beta_{3\_LL}$, $\beta_{3\_HL}$, $\beta_{3\_HH}$, and $\beta_{3\_LH}$, respectively.

Figure 8A:
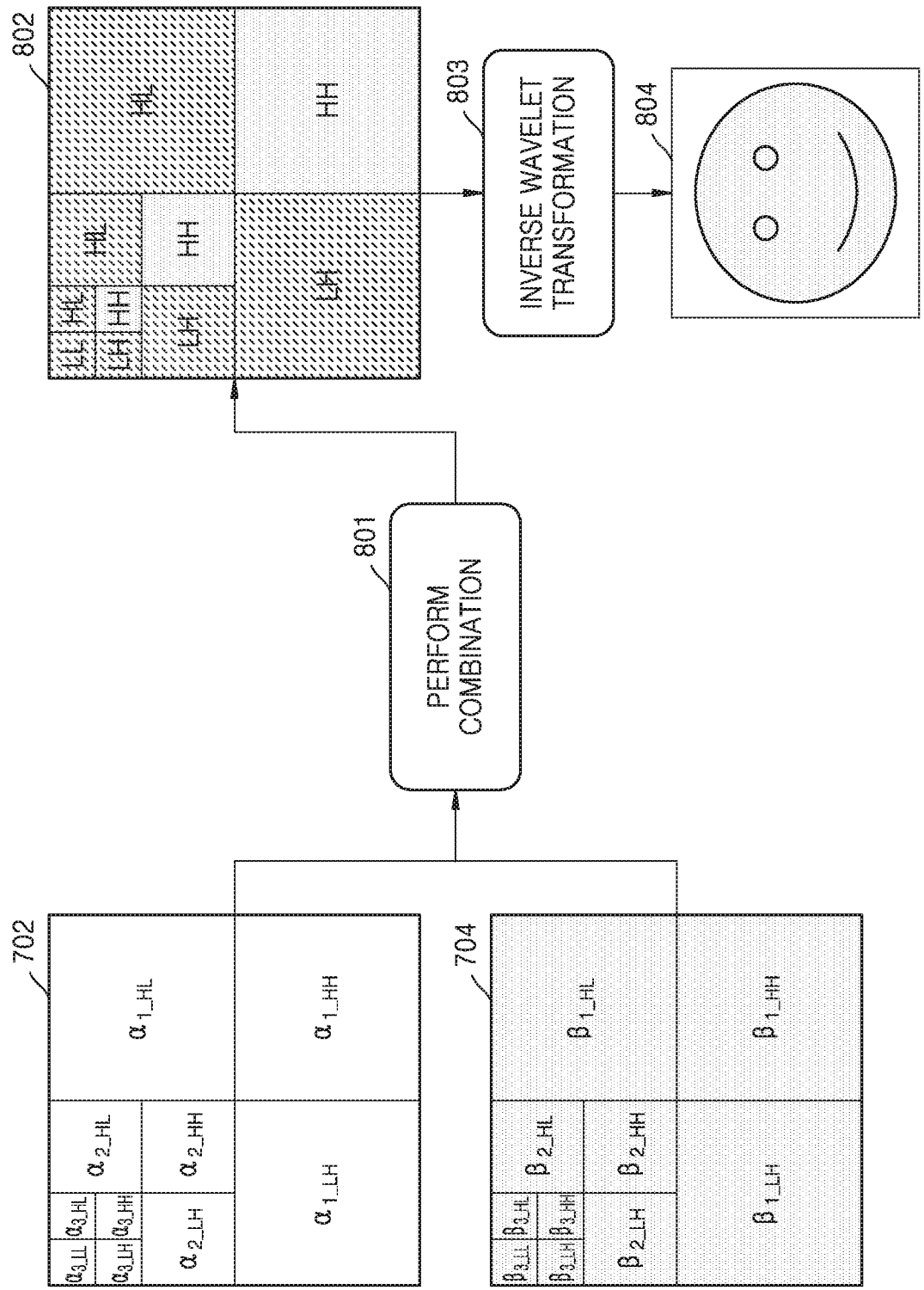
FIG. 8A illustrates a flow diagram of generating a texture restored image, according to an embodiment.

FIG. 8A illustrates a flow diagram of generating a texture restored image using the wavelet decomposed images, according to an embodiment.

Referring to FIG. 8A, the image processor 116 may be configured to obtain a wavelet image 802 from the wavelet decomposition of each of the filtered image 502 and the face ROI 202 of the source image based on the weightage factors for processing the source image. In an embodiment, the image processor 116 may be configured to select a first set of wavelet bands among multiple bands of the first wavelet decomposed image 602 based on the weightage factor corresponding to each wavelet band of the first wavelet decomposed image 602. Further, the image processor 116 may be configured to select a second set of wavelet bands among multiple bands of the second wavelet decomposed image 604 based on the weightage factor corresponding to each wavelet band of the second wavelet decomposed image 604.

The image processor 116 may be configured to combine the first set of wavelet bands and the second set of wavelet bands to obtain the wavelet image, in operation 801. In an embodiment, the image processor 116 may combine the wavelet bands, such as HL, LH, and HH, corresponding to the first level of the first wavelet decomposed image 602 with the wavelet bands, such as HL, LH, and HH, corresponding to the first level of the second wavelet decomposed image 604 by using the following Equations (3), respectively.

Subsequently, the image processor 116 may combine the wavelet bands corresponding to the second level and the third level of the first wavelet decomposed image 602 with the wavelet bands corresponding to the second level and the third level of the second wavelet decomposed image 604, respectively. For instance, the image processor 116 may combine the wavelet band HH corresponding to the first level of the first wavelet decomposed image 602 with the wavelet band HH corresponding to the first level of the second wavelet decomposed image 604 as given by the Equation (3).

$$HH_{wavelet\ image} = (\alpha_{L\_B} * HH_{second\ wavelet\ image}) + (\beta_{L\_B} * \text{abs}(HH_{first\ wavelet\ image} - HH_{second\ wavelet\ image})) \quad \text{Equation (3)}$$

where, $\alpha_{L\_B}$ and $\beta_{L\_B}$ are the variables that are derived to be different at different levels and bands.

Further, the image processor 116 may obtain the wavelet image 802 based on the combined wavelet bands obtained by combining the wavelet bands of the first wavelet decomposed image 602 with the wavelet bands of the second wavelet decomposed image 604. Subsequently, the image processor 116 may perform an inverse wavelet transformation on the wavelet image 802 to generate a smoothened image 804. The smoothened image 804 may interchangeably be referred to as the texture restored image.

Figure 8B:
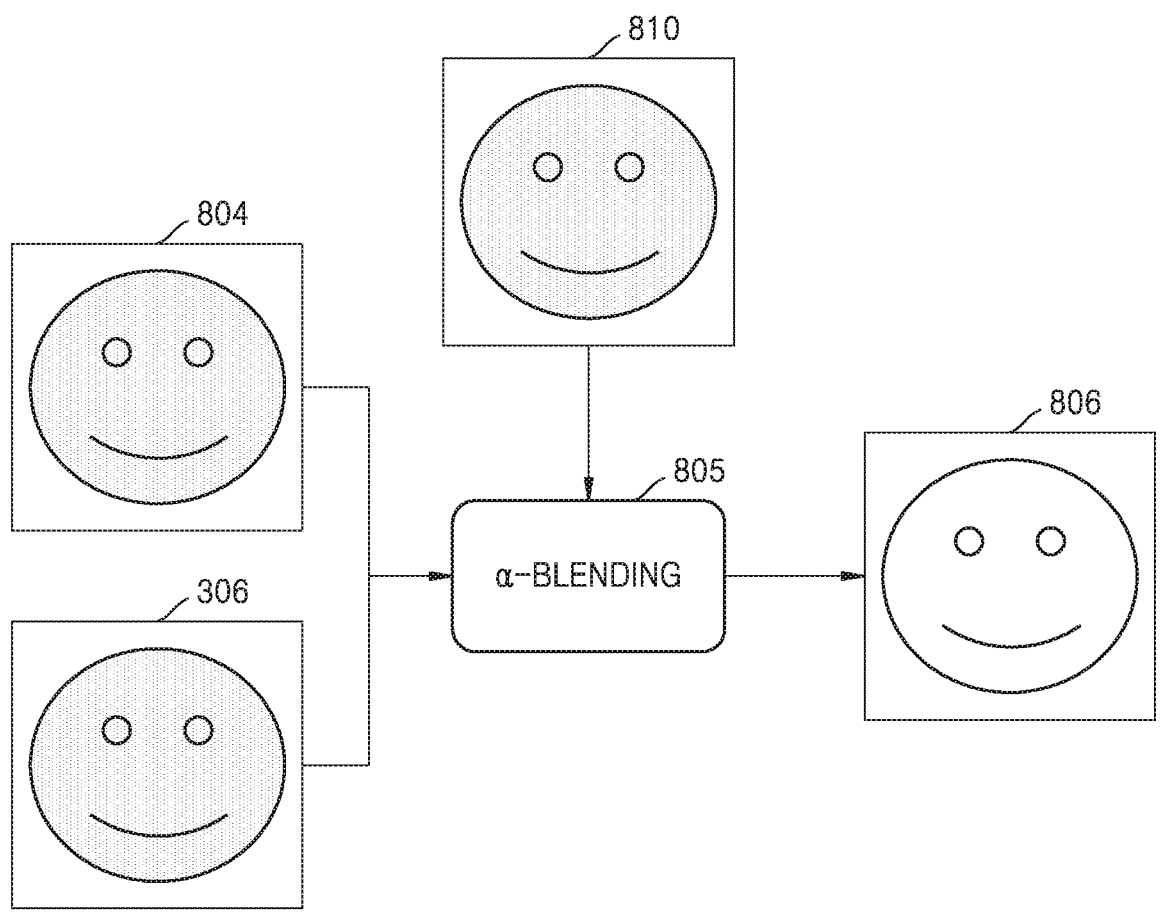
FIG. 8B illustrates a flow diagram of generating an enhanced image, according to an embodiment.

FIG. 8B illustrates a flow diagram of generating a texture restored image using the wavelet decomposed images, according to an embodiment.

Referring to FIG. 8B, the image processor 116 may implement image processing technique, such as Alpha Blending (α-blending) 805, to generate an enhanced image 806. In an embodiment, the image processor 116 may perform α-blending by using the masked image 810 (generated in operation 410), the blemish-removed image 306, and the texture restored image 804 to determine each pixel 'O' of the processed image, as given by the Equation (4).

$$O(x,y) = (1 - \alpha(x,y)) * I_S(x,y) + \alpha(x,y) * I_T(x,y) \quad \text{Equation (4)}$$

In the Equation (4), 'x' and 'y' denotes coordinates of a pixel in the enhanced image 806. Further, '$I_S(x, y)$' denotes a location of a pixel associated with the blemish-removed image 306. '$I_T(x, y)$' denotes a location of a pixel associated with the masked image 410. The enhanced image 806 generated by the image processor 116 may be a fine-grained texture manipulated image.

FIG. 9 illustrates a flowchart for processing an image, according to an embodiment.

For the sake of brevity, details of the disclosure that are described in detail above referring to FIG. 1 through FIG. 8B are not repeated again in the description of FIG. 9.

In operation 902, the method 900 includes determining information associated with the source image. The information may be indicative of at least one facial characteristic associated with at least one face in the source image processing the source image using the filter based on the information associated with the source image. In operation 904, the method 900 includes processing the source image using the filter based on the information associated with the source image. In operation 906, the method 900 includes performing wavelet decomposition on each of the filtered image and the source image. In operation 908, the method 900 includes determining weight values associated with the wavelet decomposition of each of the filtered image and the source image, based on the information associated with the source image. In operation 910, the method 900 includes obtaining the wavelet image to generate the texture restored image from the wavelet decomposition of each of the filtered image and the source image based on the weight values for processing the source image.

Further, the method 900 includes obtaining the ROI from the source image to be processed. The ROI may be indicative of at least one face in the source image. The method 900 also includes determining at least one skin region and at least one other region associated with the ROI obtained from the source image. The at least one another region may be associated with hair-like features of the face. Further, the method 900 includes generating the masked image based on the at least one skin region and the at least one another region associated with the ROI.

In an embodiment, the method 900 includes determining at least one region associated with the ROI obtained from the source image. The at least one region may be indicative of at least one blemish on the at least one face. Further, the method 900 includes generating the blemish-removed image based on the at least one region associated with the ROI. The method 900 also includes processing the source image using the filter based on the masked image, the blemish-removed image, and the at least one facial characteristic associated with the source image.

In an embodiment, the method 900 includes determining the number of levels of decomposition to be performed on each of the filtered image and the source image. The number of levels of decomposition to be performed may be determined based on the at least one facial characteristic associated with the source image. The method 900 also includes performing the wavelet decomposition for the determined number of levels on the source image to generate the first wavelet decomposed image. Further, the method 900 includes performing the wavelet decomposition for the determined number of levels on the filtered image to generate the second wavelet decomposed image.

In an embodiment, the method 900 includes determining the weightage factor corresponding to each wavelet band at multiple levels of each of the first wavelet decomposed image and the second wavelet decomposed image based on the at least one facial characteristic. The first wavelet decomposed image may be generated by wavelet decomposition of the source image. Similarly, the second wavelet decomposed image may be generated by wavelet decomposition of the filtered image.

In an embodiment, the method 900 includes selecting the first set of wavelet bands among multiple bands of the first wavelet decomposed image based on the weightage factor corresponding to each wavelet band of the first wavelet decomposed image. Further, the method 900 includes selecting the second set of wavelet bands among multiple bands of the second wavelet decomposed image based on the weightage factor corresponding to each wavelet band of the second wavelet decomposed image. The method 900 also includes combining the first set of wavelet bands and the second set of wavelet bands to generate the wavelet image.

The electronic device 100 generates the filtered image by using the guided filter based on the facial characteristics associated with the face in the source image. Owing to implementation of such facial characteristics for processing the source image, the electronic device 100 generates the filtered image with retained skin texture as compared to the source image and other facial features, such as hair-like features of the face.

Further, as described above, the electronic device 100 may process the source image based on the facial characteristics associated with the face in the source image. For instance, the electronic device 100 generates wavelet decomposed images corresponding to the source image and the filtered image based on the facial characteristics, such as the age associated with the face and the gender associated with the face. For example, the electronic device 100 may generate the wavelet decomposed images with higher number of bands for the gender, such as male, in comparison for the gender, such as female.

Similarly, the electronic device 100 may generate the wavelet decomposed images with higher number of bands for the face associated with an older person in comparison to the face associated with a child. Hence, the electronic device 100 provides dynamic processing of the image based on the facial characteristics of the face identified in the source image. Therefore, the disclosure offers the electronic device 100 and the method 900 that are comprehensive, accurate, intelligent, timesaving, convenient, and consistent.

In an embodiment, a method of processing a facial image is provided. The method includes obtaining facial characteristics associated with at least one face in a source image, generating a filtered image by filtering the source image, performing wavelet decomposition on each of the filtered image and the source image, determining weight values associated with the wavelet decomposition performed on each of the filtered image and the source image, and generating a wavelet image from the wavelet decomposition of each of the filtered image and the source image based on the weight values.

In an embodiment, the facial characteristics include at least one of a level of skin texture, an amount of blemishes, an average size of blemishes, age associated with the face image, and gender associated with the face image.

In an embodiment, the generating of the filtered image includes obtaining, from the source image, an ROI which is indicative of at least one face included in the source image, determining at least one skin region and a second region other than the skin region based on the ROI, and generating a masked image based on the at least one skin region and the second region.

In an embodiment, the generating of the filtered image further includes determining at least one blemish region including at least one blemish on the at least one face, generating a blemish-removed image by removing the at least one blemish from the at least one face, and generating the filtered image based on the blemish-removed image.

In an embodiment, the generating of the filtered image further includes smoothing the at least one blemish region to generate a smooth region replacing the at least one blemish region.

In an embodiment, the smoothing of the at least one blemish region includes replacing pixels associated with the at least one blemish region with pixels surrounding the at least one blemish region.

In an embodiment, the method further includes detecting a plurality of face landmarking points on the at least on face in the source image, and obtaining an initial masked image based on probability approximation by connecting the face landmarking points and filling the face landmarking points with different gray values than gray values of the face landmarking points, where the generating of the masked image includes generating the masked image by refining the initial masked image.

In an embodiment, the face landmarking points located at at least one of a contour of eyes, eye-brows, a nose, or a face shape of the at least one face in the source image.

In an embodiment, the refining of the initial masked image is performed by computing skin probability of each pixel in a face ROI which is indicative of at least one face included in the source image.

In an embodiment, the performing of the wavelet decomposition on each of the filtered image and the source image includes determining, based on the facial characteristics, a number of levels for the wavelet decomposition to be performed on a face ROI which is indicative of at least one face included in the source image.

In an embodiment, the determining of the number of levels for the wavelet decomposition to be performed includes allocating a higher number of levels for the wavelet decomposition to the face image associated with a male than the face image associated with a female.

In an embodiment, the performing of the wavelet decomposition on each of the filtered image and the source image further includes generating a first wavelet decomposed image, a second wavelet decomposed image and a third wavelet decomposed image based on a determination that the number of levels is three, wherein each of the first, second and third wavelet decomposed image includes at least four wavelet bands, and wherein the determining of the weight values associated with the wavelet decomposition includes determining the weight values corresponding to each of the wavelet bands.

In an embodiment, the generating of the wavelet image includes generating the wavelet image by combining the four wavelet bands of each of the first, the second, and the third wavelet decomposed image, and obtaining a smoothened image indicative of a texture restored image by performing an inverse wavelet transformation on the wavelet image.

In an embodiment, an electronic device for processing a facial image is provided. The electronic device includes at least one image capturing device configured to capture least one face in a source image; a processor configured to obtain facial characteristics associated with at least one face in a source image, generate a filtered image by filtering the source image, perform wavelet decomposition on each of the filtered image and the source image, determine weight values associated with the wavelet decomposition performed on each of the filtered image and the source image, and generate a wavelet image from the wavelet decomposition of each of the filtered image based on the weight values.

While specific language has been used to describe the disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

While embodiments of the disclosure have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A method of generating a texture restored image based on a source image, the method comprising:
   determining information indicative of at least one facial characteristic associated with at least one face in the source image;
   processing the source image using a filter based on the determined information, to obtain a filtered image;
   performing wavelet decomposition on each of the filtered image and the source image;
   determining weightage factors associated with the wavelet decomposition of the filtered image and weightage factors associated with the wavelet decomposition of the source image, based on the determined information; and
   obtaining a wavelet image by performing a combination of the wavelet decomposition of the filtered image and the wavelet decomposition of the source image, by using the weightage factors associated with the wavelet decomposition of the filtered image and the weightage factors associated with the wavelet decomposition of the source image, to generate the texture restored image based on the wavelet image.

2. The method of claim 1, further comprising generating an enhanced image by applying image-processing to the texture restored image.

3. The method of claim 1, wherein the at least one facial characteristic includes at least one from among a level of a skin texture, an amount of blemishes, an average size of blemishes, an age associated with the at least one face, and a gender associated with the at least one face.

4. The method of claim 1, wherein the processing the source image using the filter further comprises:
   obtaining, from the source image, a region of interest (ROI) indicative of the at least one face in the source image;
   determining at least one skin region and at least one other region that are associated with the ROI; and
   generating a masked image based on the at least one skin region and the at least one other region.

5. The method of claim 4, further comprising:
determining at least one area associated with the ROI, the at least one area being indicative of at least one blemish on the at least one face;
generating a blemish-removed image based on the at least one area; and
processing the source image using the filter based on the masked image, the blemish-removed image, and the at least one facial characteristic.

6. The method of in claim 1, wherein the performing the wavelet decomposition further comprises:
determining a number of levels of decomposition to be performed on each of the filtered image and the source image, respectively, based on the at least one facial characteristic;
performing the wavelet decomposition for the determined number of levels on the source image to generate a first wavelet decomposed image; and
performing the wavelet decomposition for the determined number of levels on the filtered image to generate a second wavelet decomposed image.

7. The method of claim 1, wherein the determining the weightage factors associated with the wavelet decomposition of the filtered image and the weightage factors associated with the wavelet decomposition of the source image further comprises:
determining a weightage factor among the weightage factors that corresponds to each wavelet band at multiple levels of each of a first wavelet decomposed image and a second wavelet decomposed image, respectively, based on the at least one facial characteristic,
wherein the first wavelet decomposed image is generated by the wavelet decomposition of the source image and the second wavelet decomposed image is generated by the wavelet decomposition of the filtered image.

8. The method of claim 7, further comprising:
selecting a first set of wavelet bands among multiple bands of the first wavelet decomposed image based on the weightage factor corresponding to each wavelet band of the first wavelet decomposed image;
selecting a second set of wavelet bands among multiple bands of the second wavelet decomposed image based on the weightage factor corresponding to each wavelet band of the second wavelet decomposed image; and
combining the first set of wavelet bands and the second set of wavelet bands to generate the wavelet image.

9. An electronic device for generating a texture restored image based on a source image, the electronic device comprising:
a processor configured to:
determine information indicative of at least one facial characteristic associated with at least one face in the source image;
process the source image using a filter based on the determined information, to obtain a filtered image;
perform wavelet decomposition on each of the filtered image and the source image, respectively;
determine weightage factors associated with the wavelet decomposition of the filtered image, based on the determined information;
determine weightage factors associated with the wavelet decomposition of the source image, based on the determined information; and
obtain a wavelet image by performing a combination of the wavelet decomposition of the filtered image and the wavelet decomposition of the source image, by using the weightage factors associated with the wavelet decomposition of the filtered image and the weightage factors associated with the wavelet decomposition of the source image, to generate the texture restored image based on the wavelet image.

10. The electronic device of claim 9, wherein the processor is further configured to generate an enhanced image by applying image-processing to the texture restored image.

11. The electronic device of claim 9, wherein the at least one facial characteristic includes at least one from among a level of a skin texture, an amount of blemishes, an average size of blemishes, an age associated with the at least one face, and a gender associated with the at least one face.

12. The electronic device of claim 9, wherein, in the processing the source image using the filter, the processor is further configured to:
obtain, from the source image, a region of interest (ROI) indicative of the at least one face in the source image;
determine at least one skin region and at least one other region that are associated with the ROI; and
generate a masked image based on the at least one skin region and the at least one other region.

13. The electronic device of claim 12, wherein the processor is further configured to:
determine at least one area associated with the ROI, the at least one area being indicative of at least one blemish on the at least one face;
generate a blemish-removed image based on the at least one area; and
process the source image using the filter based on the masked image, the blemish-removed image, and the at least one facial characteristic.

14. The electronic device of claim 9, wherein, in the performing the wavelet decomposition, the processor is further configured to:
determine a number of levels of decomposition to be performed on each of the filtered image and the source image, respectively, based on the at least one facial characteristic;
perform the wavelet decomposition for the determined number of levels on the source image to generate a first wavelet decomposed image; and
perform the wavelet decomposition for the determined number of levels on the filtered image to generate a second wavelet decomposed image.

15. The electronic device of claim 9, wherein the processor is further configured to:
determine a weightage factor among the weightage factors that corresponds to each wavelet band at multiple levels of each of a first wavelet decomposed image and a second wavelet decomposed image based on the at least one facial characteristic,
wherein the first wavelet decomposed image is generated by the wavelet decomposition of the source image and the second wavelet decomposed image is generated by the wavelet decomposition of the filtered image.

16. The electronic device of claim 15, wherein the processor is further configured to:
select a first set of wavelet bands among multiple bands of the first wavelet decomposed image based on the weightage factor corresponding to each wavelet band of the first wavelet decomposed image;
select a second set of wavelet bands among multiple bands of the second wavelet decomposed image based on the weightage factor corresponding to each wavelet band of the second wavelet decomposed image; and
combine the first set of wavelet bands and the second set of wavelet bands to generate the wavelet image.

17. A non-transitory computer-readable storage medium storing a computer program for operating an electronic device including a memory and a processor, the computer program including computer-readable program that, when executed by the processor, causes the electronic device to:
- determine information indicative of at least one facial characteristic associated with at least one face in a source image;
- process the source image using a filter based on the determined information, to obtain a filtered image;
- perform wavelet decomposition on each of the filtered image and the source image, respectively;
- determine weightage factors associated with the wavelet decomposition of the filtered image, based on the determined information;
- determine weightage factors associated with the wavelet decomposition of the source image, based on the determined information; and
- obtain a wavelet image by performing a combination of the wavelet decomposition of the filtered image and the wavelet decomposition of the source image, by using the weightage factors associated with the wavelet decomposition of the filtered image and the weightage factors associated with the wavelet decomposition of the source image, to generate a texture restored image based on the wavelet image.

18. The non-transitory computer-readable storage medium of claim 17, wherein the computer-readable program when executed by the processor further causes the electronic device to:
- obtain, from the source image, a region of interest (ROI) indicative of the at least one face in the source image;
- determine at least one skin region and at least one other region that are associated with the ROI;
- generate a masked image based on the at least one skin region and the at least one other region;
- determine at least one area associated with the ROI, the at least one area being indicative of at least one blemish on the at least one face;
- generate a blemish-removed image based on the at least one area; and
- process the source image using the filter based on the masked image, the blemish-removed image, and the at least one facial characteristic.

19. The non-transitory computer-readable storage medium of claim 17, wherein the computer-readable program when executed by the processor further causes the electronic device to:
- determine a number of levels of decomposition to be performed on each of the filtered image and the source image, respectively, based on the at least one facial characteristic;
- perform the wavelet decomposition for the determined number of levels on the source image to generate a first wavelet decomposed image; and
- perform the wavelet decomposition for the determined number of levels on the filtered image to generate a second wavelet decomposed image.

20. The non-transitory computer-readable storage medium of claim 17, wherein the computer-readable program when executed by the processor further causes the electronic device to:
- determine a weightage factor among the weightage factors that corresponds to each wavelet band at multiple levels of each of a first wavelet decomposed image and a second wavelet decomposed image, respectively, based on the at least one facial characteristic;
- select a first set of wavelet bands among multiple bands of the first wavelet decomposed image based on the weightage factor corresponding to each wavelet band of the first wavelet decomposed image;
- select a second set of wavelet bands among multiple bands of the second wavelet decomposed image based on the weightage factor corresponding to each wavelet band of the second wavelet decomposed image; and
- combine the first set of wavelet bands and the second set of wavelet bands to generate the wavelet image,
- wherein the first wavelet decomposed image is generated by the wavelet decomposition of the source image and the second wavelet decomposed image is generated by the wavelet decomposition of the filtered image.

* * * * *